3,193,555
3-CYANO-SUBSTITUTED YOHIMBANE ALKALOIDS
John Shavel, Jr., Mendham, and Harold Zinnes, Rockaway, N.J., assignors to Warner-Lambert Pharmaceutical Company, Morris Plains, N.J., a corporation of Delaware
No Drawing. Filed Oct. 20, 1964, Ser. No. 405,245
2 Claims. (Cl. 260—287)

This application is a continuation-in-part of application Serial No. 293,904, filed July 9, 1963, now abandoned.

The present invention relates to new and novel 3-cyano-substituted yohimbane alkaloids having the formula:

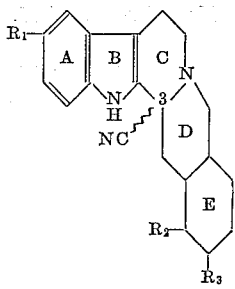

wherein $R_1$ represents hydrogen, lower alkyl, lower alkoxy or acetyl, $R_2$ represents hydrogen, lower alkyl or carbomethoxy and $R_3$ represents hydrogen, hydroxy or a keto group. This invention also includes within its scope a novel process for the production of these 3-cyano-substituted yohimbanes.

The compounds of this invention are valuable starting materials for the production of other 3-substituted yohimbane alkaloids as described in copending application Serial No. 296,938, filed July 23, 1963. Thus, for example, 3-cyano yohimbane may be treated with methyl lithium to give 3-methyl-yohimbane. These 3-substituted-yohimbane alkaloids are useful as analgesics, tranquilizers, and anti-inflammatory agents.

The compounds of this invention bear the A, B, C, D, and E rings as depicted in the above structural formula and are generally alkaloids of the yohimbane series. The use of a straight line after a substituent in the above structural formula denotes the attachment of the substituent at the particular position and is not used to indicate either alpha or beta orientation.

The terms "lower alkyl" and "lower alkoxy" as used in the specification and claims refer to branched and straight chain aliphatic groups having 1 to 6 carbon atoms. They include radicals such as methyl, ethyl, propyl, butyl, isobutyl, methoxy, ethoxy, propoxy, and the like.

It has been found that compounds of this invention may be prepared by treating 3-dehydroyohimbane salts with an alkali metal cyanide, such as potassium or sodium cyanide. The reaction may be exemplified by the following equation:

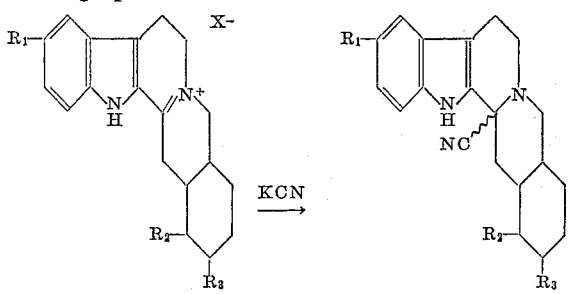

In the above equation, X represents an anion such as chloride, sulfate, perchlorate, acetate and the like. This reaction can be effected at ambient temperature, such as from 20 to 30° C. As suitable solvents for the reaction, there may be mentioned, for example, 50% aqueous methanol or 50% aqueous ethanol. The desired reaction product generally precipitates out of solution and can be recovered by conventional means such as filtration, and purified by recrystallization.

The following examples are included in order further to illustrate the present invention:

EXAMPLE 1

*3-cyanoyohimbane.*—To a stirred solution of 15.8 g. 3-dehydroyohimbane chloride in 400 ml. 50% aqueous methanol at room temperature is added a solution of 8 g. potassium cyanide in 50 ml. 50% aqueous methanol. The mixture is stirred for fifteen minutes and then allowed to stand at 20° to 25° C. for one hour. The resulting crystalline precipitate is collected by filtration, washed with two 50 ml. portions of 50% aqueous methanol followed by 50 ml. methanol, and then dried in vacuo at 60° C. for four hours to give 14.8 g. of 3-cyanoyohimbane, $[\alpha]_D = -122$ (pyridine, c.=0.65). It darkens at 95° C. and melts with decomposition at 145 to 160° C. This material is sufficiently pure to be used as an intermediate in further reactions. A portion is recrystallized from methanol to give material which darkens at 100° C., and melts with decomposition at 145 to 160° C.; $[\alpha]_D = -129$ (pyridine, c.=0.61), $[\alpha]_D = -92$ (chloroform, c.=0.52).

$\nu_{max.}^{Nujol}$ 3320 (79), 2300 (15); $\nu_{max.}^{CH_2Cl_2}$ 3440 (92), 2300 (80); $\lambda_{max.}^{CH_3CN}$ 223 (29,500), 282 (7,500), 290 (7,250), 305–312 (4700), 318 (5,000); $\lambda_{min.}$ 256 (5,000), 287 (6,750), 300 (4,500).

Analysis for $C_{20}H_{23}N_3$: Calc'd—C, 78.65; H, 7.59; N, 13.76. Found—C, 78.43; H, 8.82; N, 13.52.

EXAMPLE 2

*3-cyanoyohimbine.*—To a stirred solution of 7.8 g. 3-dehydroyohimbine chloride in 200 ml. 50% aqueous methanol at room temperature is added a solution of 4 g. potassium cyanide in 100 ml. 50% aqueous methanol. The mixture is stirred for 30 minutes and allowed to stand at room temperature for one hour. The resulting crystalline precipitate is collected by filtration, washed with two 50 ml. portions of 50% aqueous methanol followed by 50 ml. methanol, and air dried. It is recrystallized from acetonitrile and dried in vacuo at 80° C. for 2 hours to yield 4.6 g. of 3-cyanoyohimbine. The material darkens at 152° C. and melts with decomposition at 175 to 180° C.; $[\alpha]_D = +44$ (pyridine, c.=0.63). A sample after recrystallization from acetonitrile darkens at 154° C. and melts with decomposition at 178 to 185° C.; $[\alpha]_D +47°$ (pyridine, c.=0.60), $[\alpha]_D -27$ (chloroform, c=0.51).

$\nu_{max.}^{Nujol}$ 3440 (83), 3240 (79), 2300 (15), 1732 (91); $\lambda_{max.}^{CH_2Cl_2}$ 283 (8,700), 291 (9,000), 303–306 (8,800), 314–317 (8,400); $\lambda_{min.}$ 258–259 (6,100), 285 (8,000) 298 (8,000): $\lambda_{max.}^{CH_3CN}$ 223 (29,200), 282 (7,800), 289 (8,000) 305–308 (6,000), 317–318 (6,100); $\lambda_{min.}$ 256 (5,200) 286–287 (7,400), 298 (5,600).

Analysis for $C_{22}H_{25}N_3O_3$: Calc'd—C, 69.63; H, 6.64; N, 11.08. Found—C, 69.91; H, 6.79; N, 10.84.

It is to be understood that the foregoing detailed description is given merely by way of illustration and that many variations may be made therein without departing from the spirit of our invention.

Having described our invention, what we desire to secure by Letters Patent is:

1. A compound of the formula:

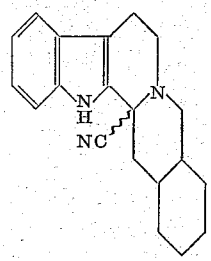

characterized by having an optical rotation of $$[\alpha]_D = -129$$

(pyridine, c.=0.61), $[\alpha]_D = -92$ (chloroform, c.=0.52) and melting with decomposition at 145° to 160° C. and produced by contacting 3-dehydroyohimbane with an alkali metal cyanide.

2. A compound of the formula:

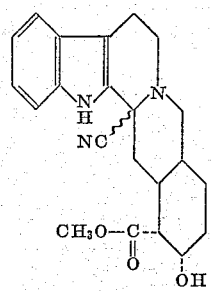

characterized by having an optical rotation of $[\alpha]_D = +47°$ (pyridine, c.=0.60), $[\alpha]_D = -27$ (chloroform, c.=0.51) and melting with decomposition at 175° to 185° C. and produced by contacting 3-dehydroyohimbine with an alkali metal cyanide.

No references cited.

WALTER A. MODANCE, *Primary Examiner.*